United States Patent Office 3,634,527
Patented Jan. 11, 1972

3,634,527
SUPPRESSION OF ISOPENTANE FORMATION IN ETHYL CHLORIDE SYNTHESIS
John W. Wagner, Pine Grove, Calif., assignor to Atlantic Richfield Company, Philadelphia, Pa.
No Drawing. Filed July 15, 1969, Ser. No. 842,006
Int. Cl. C07c 17/08
U.S. Cl. 260—663                 5 Claims

ABSTRACT OF THE DISCLOSURE

The formation of isopentane and other $C_3$ and heavier hydrocarbons formed in the synthesis of ethyl chloride by the reaction of $C_2H_4$ and HCl in $C_2H_5Cl$-$AlCl_3$ is suppressed by the addition of oxygen to the reaction system.

BACKGROUND OF THE INVENTION

Field of the invention

This invention relates to ethyl chloride synthesis and, more specifically, to the suppression of isopentane and other $C_3$ and larger hydrocarbons in the synthesis of ethyl chloride.

Description of the prior art

The reaction of ethylene with HCl in the presence of $AlCl_3$ to form ethyl chloride is described by Curme, U.S. Pat. No. 1,518,182. A similar reaction carried out at less than 10° C. is described by Suida, U.S. Pat. No. 1,637,972. $C_2H_4$ fractionated from petroleum refinery gas may be reacted with HCl as a source of ethyl chloride, see Hjerpe and Gruse, U.S. Pat. No. 1,944,839.

Pierce has described a cyclic process in which a propyl chloride-$AlCl_3$ reaction medium is stripped of ethyl chloride and recirculated to the reaction zone, U.S. Pat. No. 2,140,927. Other processes using propyl chloride are described by Chamberlain et al., U.S. Pat. Nos. 2,140,507 and 2,140,508. A mixture of ethyl chloride and propyl chloride containing $AlCl_3$ catalyst is used in a process described by Schwegler and Tennant, U.S. Pat. No. 2,469,-702.

Kohler, U.S. Pat. No. 2,786,875 describes a process for the hydrochlorination of ethylene at 125° C., 125 p.s.i. in which the conversion of $C_2H_4$ and HCl to $C_2H_5Cl$ is improved by $CO_2$ and $C_2H_2$.

Neher, U.S. Pat. No. 2,818,447, describes a process wherein gaseous HCl and $C_2H_4$ are mixed at pressures greater than 100 p.s.i. and passed into a catalyst solution of 0.2–0.3 weight percent $AlCl_3$ in ethyl chloride which is maintained at 50° C. Ethyl chloride is formed and the catalyst deactivated. The catalyst concentration is maintained constant from a separate supply of anhydrous $AlCl_3$ maintained at 250° C. The vapor pressure of the $AlCl_3$ is greater than that of the catalyst solution and a thin stream of $AlCl_3$ is forced into the feed stream at a rate corresponding to the deactivation rate. Polymer formation, resulting from the usual cyclic addition of $AlCl_3$, is reduced by the maintenance of a constant $AlCl_3$ concentration.

O'Connell and Huguet, U.S. Pat. No. 2,818,448, describe the reaction of $C_2H_4$ with HCl in ratios of 0.98–1.02 moles HCl/mole $C_2H_4$. All of the HCl and ½ to 19/20 of the $C_2H_4$ are fed to the bottom of a first reaction at 115–125° C. in contact with an $AlCl_3$ catalyst in ethyl chloride. Unreacted HCl and the remaining $C_2H_4$ are then fed to a second reaction zone in contact with the same catalyst system until all of the $C_2H_4$ is reacted. High HCl concentrations are maintained, in this process, despite variations in $C_2H_4$ content.

The basic processes for producing ethyl chloride by the reaction of HCl and $C_2H_4$ in the presence of $AlCl_3$ in ethyl chloride are well known, as illustrated by the foregoing references, which are incorporated herein. Polymer formation is a serious problem in all known processes and, as certain of the references illustrate, various precautions have been taken to reduce the severity of this problem. The formation of isopentane, by a combination of polymerization and alkylation type reactions from ethyl chloride and/or ethylene, is especially serious. Isopentane azeotropes with ethyl chloride and therefore cannot be removed completely by distillation. Consequently, significant and detrimental amounts of isopentane impurities have been tolerated in ethyl cholride. Ethyl chloride is useful as an intermediate in the formation, for example, of tetraethyl lead, as a lead scavenger in gasolines, in the formation of vinyl chloride, etc. It is the object of this invention to provide an improved process wherein the formation of isopentane and other less detrimental $C_3$ and higher molecular weight hydrocarbons is suppressed.

SUMMARY OF THE INVENTION

I have discovered that the addition of oxygen to the reaction system comprising $AlCl_3$-$C_2H_5Cl$ in the synthesis of $C_2H_5Cl$ from $C_2H_4$ and HCl suppresses the formation of isopentane and other $C_3$ and higher molecular weight hydrocarbons. The object of this invention, therefore, is to provide an improved process for the synthesis of ethyl chloride.

A more specific object of the invention is to inhibit the formation of isopentane in the process wherein $C_2H_4$ is reacted with HCl in the presence of liquid $C_2H_5Cl$ and $AlCl_3$ to form $C_2H_5Cl$.

Additional and more specific, but non-limiting, objects of the invention will be apparent from the specification which follows.

DESCRIPTION OF THE PREFERRED EMBODIMENTS

As previously indicated, the basic process involved in this invention is quite well known in the art and is described in a number of patents, previously incorporated by reference, and the publications. See, for example, Tulleners et al., A New Process for the Addition of Ethylene and Hydrogen Chloride and Similar Processes. Rec. trav. chim. 53, 544–54 (1934). An extended discussion of the basic process is, therefore, unwarranted.

Briefly, however, the process in which this invention has been found useful involves the intermixture of HCl and $C_2H_4$ in a reaction medium comprising liquid $C_2H_5Cl$ and a Friedel Crafts catalyst, $AlCl_3$ for example. $AlCl_3$ is dissolved in $C_2H_5Cl$ and maintained at a desired level, in the range of for example from 0.1 percent to 10 percent, by weight. Various techniques, some described in the references previously included, are available for maintaining the catalyst activity in the system. The reaction is carried out in the liquid phase, i.e., the ethyl chloride is maintained in the liquid phase. The reaction temperature may range from about 0° C. to about 150° C., and the pressure may range from about 1 atmosphere pressure to greater than 10 atmospheres pressure. The pressure is not critical except insofar as sufficient pressure is required to maintain the ethyl chloride in the liquid phase. The preferred temperature range is from about 0° C. to about 125° C. and, typically, may be in the general vicinity of about 50° C., i.e., 50° C. plus or minus about 10 or 15 degrees. Temperature is not critical insofar as this invention is concerned, but optimum conversion is somewhat dependent on temperature as it is interrelated with reactor design, catalyst content, etc.

The reaction may be carried out in a vertical tubular reactor wherein the reaction medium, $C_2H_5$-$AlCl_3$, is mixed by the injection of gaseous HCl and $C_2H_4$ at a low point in the reactor. $AlCl_3$, as a gas at high temperature or in solution, or otherwise, may be injected continuously or intermittently to maintain the catalyst activation in the system. $C_2H_5Cl$ is removed from the upper part of the reactor.

The ethyl chloride removed is intermixed with a variety of reaction products. This reaction mixture is, conventionally, first fractionated to remove higher boiling materials and then subjected to a second fractionation step to remove low boiling lighter components. This procedure is satisfactory for the removal of most hydrocarbons having three or more carbon atoms. Isopentane, however, azeotropes with ethyl chloride and is removed from the fractionation tower therewith. Simple fractionation is insufficient to separate the contaminant isopentane from the desired product stream of ethyl chloride. It is, therefore, very important to suppress the formation of $C_3$ and higher hydrocarbons, isopentane in particular, in the synthesis of ethyl chloride.

In studying this reaction system to determine a method for suppressing the isopentane formation, I inadvertently permitted the leakage of air into the reaction vessel. Quite to my surprise, the level of isopentane formed was very much lower in this experiment than in parallel experiments bing run at the same time. Following this discovery, air and oxygen additions were made at various levels and under various reaction conditions to verify the initial results. From these experiments it was determined that, quite unexpectedly, the addition of oxygen in from trace to rather significant amounts has a marked beneficial effect in the suppression of isopentane formation, and the formation of other $C_3$ and higher molecular weight hydrocarbons in the synthesis of ethyl chloride from ethylene and hydrogen chloride.

The catalyst concentration is also known to have an effect on the formation of $C_3$ and higher molecular weight hydrocarbons, including isopentane. The oxygen inhibiting effect is, however, in addition to the effect noted by careful control of catalyst concentration. The effect of oxygen and catalyst concentration on products from the reaction of ethylene and HCl is illustrated in the data shown in Table I.

TABLE I.—EFFECT OF OXYGEN AND CATALYST CONCENTRATION ON PRODUCTS FROM REACTION OF ETHYLENE AND HCl [a]

| Catalyst concentration, ~ wt. percent | 10 | 10 | 1 | 1 |
|---|---|---|---|---|
| Gas impurity | None | [b] Oxygen | None | [b] Oxygen |
| G. C. Analysis, area percent: [c] | | | | |
| iC[4] | 6.1 | 5.5 | 0.25 | 0.13 |
| Ethyl chloride | 90.2 | 93.3 | 99.55 | 99.80 |
| iC[5] | 3.7 | 1.2 | 0.20 | 0.07 |

[a] Reaction time 2 hours, reaction temperature = ~0° C, ethylene and HCl = ~150 ml./min.
[b] Approximately=1 vol. percent.
[c] Normalized to three items reported.

It will be noted that the catalyst concentration has a very significant effect upon the conversion to ethyl chloride. At 10 percent catalyst concentration and at 1 percent catalyst concentration oxygen addition has a marked effect upon the formation of $C_3$ and greater hydrocarbons. Most importantly, in the present process is the significant reduction in formation of isopentane both at the 10 percent catalyst concentration level and at the 1 percent catalyst concentration level. I am, however, unable to postulate with any certainty a reason or mechanism for this result.

Similar experiments carried out under varying conditions verified the results exemplified by the data in Table I. Similar results were obtained, for example, at 25° C., 50° C., etc. The same effect was noted whether the addition was of oxygen or of air. Exact limits for the operability of the invention have not been determined but it is believed that oxygen additions in the range of from about 0.001 to about 20 volume percent, based on the combined HCl and $C_2H_4$ feed, are effective in reducing the formation of isopentane, and other hydrocarbons. Most beneficial results occur in the level of from about 0.001 to about 10 percent and, while not completely determined, it is believed that the optimum range for addition of oxygen is in the general vicinity of about 1 percent, i.e., from roughly 0.1 percent to roughly 3 percent. Perhaps the optimum level of oxygen addition is a function of catalyst concentration, temperature, etc., but these have not been determined. Optimum levels, however, can be determined by routine experimentation. Above a certain level of oxygen addition, no further suppression of isopentane formation is obtained and greater additions of oxygen are not beneficial, although they are not necessarily detrimental.

Oxygen may be added in mixture with HCl or in an HCl-$C_2H_4$ mixture. Alternatively, oxygen may be added directly to the liquid $C_2H_5CH$-$AlCl_3$ system. The point and nature of addition is immaterial except that it is necessary to provide oxygen in the reaction medium.

From the foregoing, it will be apparent that the inventive process produces quite unexpected and advantageous results in the synthesis of ethyl chloride from ethylene and hydrogen chloride. Certain modifications and adaptations of this process will be obvious to one skilled in the art from the foregoing description. The addition of oxygen to the fully equivalent propyl chloride systems and equivalent Friedel Crafts catalyst systems is but one obvious variation of the practice of the present invention. Other modifications will be apparent to this skilled in the art and may be made without departing from the spirit and scope of the following claims.

I claim:
1. In the process for synthesizing ethyl chloride by the reaction of ethylene with HCl in the presence of $AlCl_3$ catalyst in liquid ethyl chloride at temperatures in the range of about 0° C. to about 150° C. the improvement comprising adding oxygen to the ethyl chloride-$AlCl_3$ reaction system to thereby inhibit the formation of isopentane and other $C_3$ and greater hydrocarbons.

2. The process of claim 1 wherein oxygen in the range of about 0.0001 to about 20 volume percent, based on combined HCl and ethylene feed, is added.

3. The process of claim 1 wherein the oxygen range is from about 0.001 to about 10 percent.

4. The process of claim 3 wherein the temperature is from about 0° C to about 125° C.

5. The process of claim 4 wherein the temperature is in the general vicinity of about 50° C. and the oxygen addition level is in the general vicinity of about 1 percent.

References Cited

UNITED STATES PATENTS 3,345,421    2/1971    Brown.

DANIEL D. HORWITZ, Primary Examiner